Figure 1:
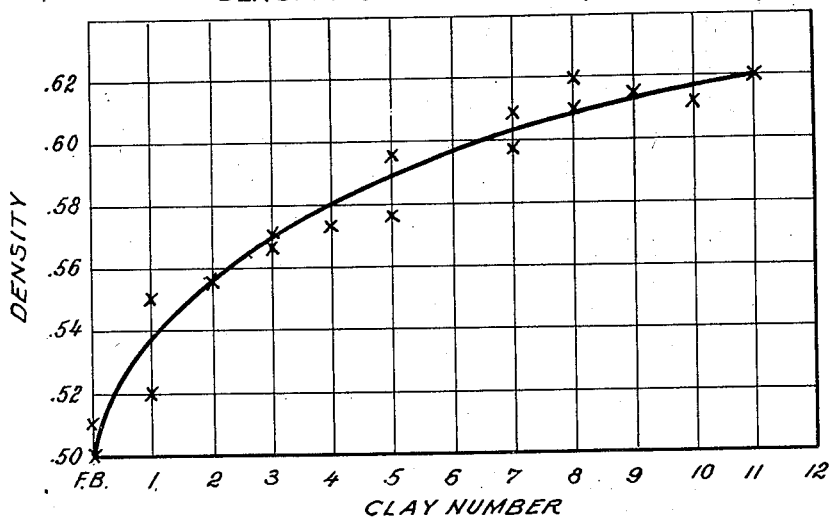

Oct. 20, 1942.   T. P. SIMPSON ET AL   2,299,258
ACTIVATION OF PETROLEUM ADSORBENTS
Filed Nov. 8, 1940   2 Sheets-Sheet 1

DENSITY OF BURNED CLAYS

DECOLORIZING EFFICIENCY VS. CLAY DENSITY

INVENTORS:
Thomas P. Simpson,
John W. Payne, and
BY Peter D. Valas.

Arthur V. Danner
ATTORNEY

Oct. 20, 1942.       T. P. SIMPSON ET AL       2,299,258
              ACTIVATION OF PETROLEUM ADSORBENTS
                     Filed Nov. 8, 1940       2 Sheets—Sheet 2

INVENTORS:
Thomas P. Simpson,
John W. Payne, and
Peter D. Valas.
BY
Arthur V. Danner
ATTORNEY Patented Oct. 20, 1942

2,299,258

UNITED STATES PATENT OFFICE 2,299,258

ACTIVATION OF PETROLEUM ADSORBENTS

Thomas P. Simpson, John W. Payne, and Peter D. Valas, Woodbury, N. J., assignors to Socony-Vacuum Oil Company, Incorporated, New York, N. Y., a corporation of New York Application November 8, 1940, Serial No. 364,820

3 Claims. (Cl. 252—280)

This invention relates to a method for improving the activity and life of solid adsorbent materials used in the refining of carbonaceous products. The invention is especially concerned with the regeneration of clays and the like used in the refining of acid-treated petroleum oils.

Practically all petroleum products require some refining to produce a marketable product. In former years the refining of petroleum oils almost universally comprised a sulfuric acid treatment for removing undesirable components. Of late years a considerable amount of the sulfuric acid treating of lubricating oils has been eliminated by the advent of solvent refining. In these well known solvent refining processes the solvents make preferential selections of the desired components. However, whether the oils are subjected to sulfuric acid treatment or to solvent refining or to both, it is common practice to pass the oils through a further refining treatment wherein they are contacted with solid adsorbent materials such as clays. The clays serve principally to improve the color of the oil but may also perform additional refining actions. In the usual practice today, and particularly with respect to lubricating oils, the oil is percolated through granules of the clay. Other practices comprise contacting the oil with finely pulverized clay in the so-called contact process, and contacting vapors of the oil with clay granules in the vapor treating process.

After clays have refined a certain amount of oil they become so contaminated with carbonaceous impurities collected from the oil that the clays become "spent" and must either be regenerated or discarded. Heretofore the regeneration of spent clays has been effected principally by "burning," that is, an operation in which substantially all the carbonaceous matter is burned off. The conventional procedures for regenerating clays by burning are carried out in multiple hearth kilns or rotary kilns. The efficiency of the clays progressively decreases with each regeneration until after five or ten burns, regenerations of this type fail to revivify the clays sufficiently to make their further use feasible.

In our co-pending application S. N. 275,672, filed May 25, 1939, we disclose a process of regenerating spent adsorbent particles carrying carbonaceous matter by "carbonization," that is, by carbonizing at least a portion of the carbonaceous matter rather than burning it all off, so that an active carbon layer is formed on the surface of the adsorbent particles. In our co-pending application S. N. 275,673, filed May 25, 1939, we disclose that when adsorbent particles carrying petroleum matter are carbonized and then used to treat solvent refined oils, as distinguished from acid-refined oils, an amazing increase in efficiency is obtained which may be of the order of 200% or 300% as compared to fresh clay as 100%, and, further, the efficiency of the carbonized particles for solvent refined oils returns to this high efficiency level with each carbonizing regeneration. On the other hand, when such carbonized particles are used to treat acid-refined oils, for some unknown reason, the above-mentioned high efficiency level is not obtained. Also, with each carbonizing regeneration the efficiency of the particles for acid-refined oils steadily decreases in somewhat the same manner as that observed in multiple hearth kiln or rotary kiln "burning" regenerations.

It is an object of our invention to provide a method of improving the efficiency of processes of refining petroleum products with adsorbents.

Another object is to provide a method of increasing the useful life of adsorbents used in treating petroleum oils which method is capable of regenerating the adsorbents a greater number of times to a sufficiently high efficiency to warrant regeneration and thereby substantially reduce the waste of discarding clays.

A more specific object is to increase the useful life of adsorbents used in the refining of acid-treated lubricating oils.

The present invention is based upon the discovery that an adsorbent, e. g., clay, which has undergone a series of carbonizing treatments until it has a low refining activity for acid-treated oils may be subjected to a burning regeneration to remove substantially all the carbon thereon and thereby obtain a clay that has a substantially improved activity which activity may approach or even exceed the original activity of the fresh clay. And it has been found that this burned clay may be sent through many similar carbonizing and burning cycles, thus indefinitely extending its useful life.

Therefore, contrary to the prior conventional burning regenerations in multiple hearth kilns or rotary kilns which necessitate discarding the clays to waste after five or ten regenerations, we carbonize the clays for these five or ten regenerations, thereby usually affording an adsorbent of somewhat higher efficiency even for acid-refined oils, and then at the end of these carbonizing regenerations instead of throwing away the clays we subject them to a burning regeneration whereby their efficiency is substantially restored to that of the original fresh clay. We then proceed to take the clays through another series of carbonizing regenerations until low efficiency is reached again whereupon we again burn the clays, and in such manner we indefinitely extend the life of the clays by our novel cyclic process.

At present our invention appears to be most useful for clays or other adsorbents used on acid-refined oils since their activity may decrease with a series of regenerations and is never as high as that of the clays used on solvent refined oils. However, it may be desirable at times to practice the present invention on clays used for treating solvent refined oils or other petroleum oils. All clays after being carbonized many times accumulate more and more carbon. Hence it may be found desirable at various times to burn off the accumulated carbon from any clay and start through a fresh series of carbonizing regenerations. Accordingly while the invention is discussed principally from the point of view of regenerating clays used on acid-treated oils it is to be understood that clays or other adsorbents used in treating solvent treated oils or other petroleum oils also may be sent through the carbonizing-burning cycles of the present invention.

While we do not wish to be held to any theory, it is quite probable that the reason the carbonized clays may be burned back to substantially their original activity is because the carbonizing treatment prevents or does not create substantial increase in the density of the clays.

Figure 2:
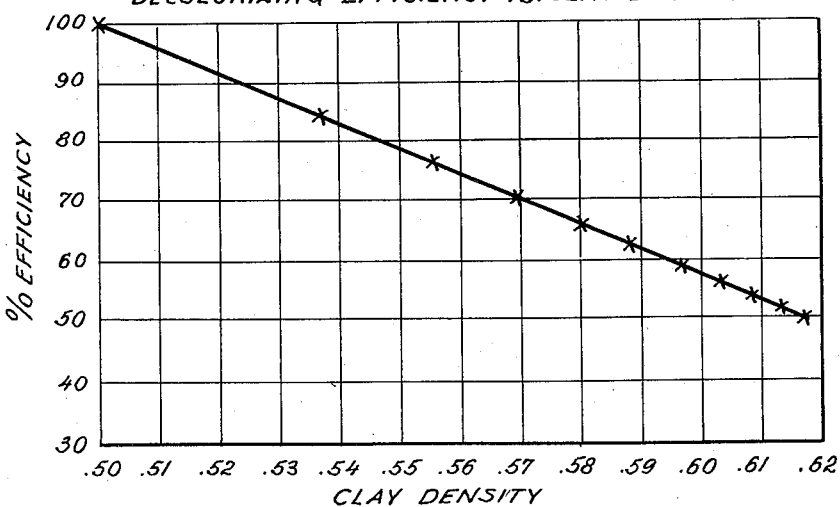
Figure 3:
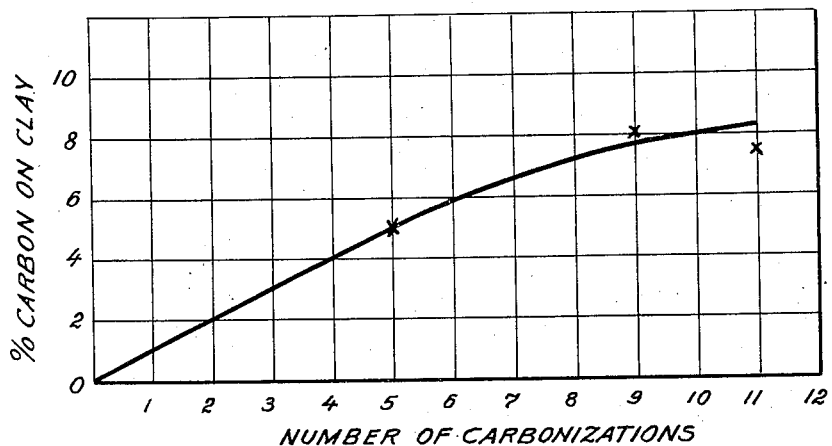

For a better understanding of this theory reference will be made to the accompanying drawings wherein: Fig. 1 is a graph showing the relation between density of the clay and the number of burnings the clay has had; Fig. 2 is a graph showing relation between decolorizing efficiency and density of the clay; and, Fig. 3 is a graph showing relation between amount of carbon on clay and number of our carbonizing regenerations the clay has had. The increase in density of clays is in direct proportion to their decrease in efficiency. For instance clays reactivated by conventional burning methods suffer an increase in density of about 20% and a decrease in efficiency of about 50% during ten regenerations. This relation between decolorizing efficiency and clay density for conventional multiple hearth burned clay is shown in the graphs of Figs. 1 and 2. On the other hand clays regenerated by carbonization show only slight increase in density, the increase in density being primarily the result of carbon build-up in the clay. This increase in density of carbonized clays amounts to about 0.5% to 0.1% (wt.) carbon per reactivation as shown by the graph of Fig. 3.

Accordingly after a clay has been carbonized several times it may be burned to remove carbon and obtain a clay whose density has not been substantially increased and, therefore, whose efficiency has not been substantially decreased. Thus theoretically the clay could be sent through at least as many carbonizing-burning cycles as it could stand burning regenerations. Since there is approximately a 2% loss of clay per regeneration through handling, the majority of any given unit of the clay would be lost in operation before it could no longer be regenerated to satisfactory efficiency. In regenerations wherein the impurities or carbon are burned from the clay an extremely close temperature control should be maintained as otherwise inefficient regeneration or damage to the clay results. The optimum temperatures for clay burning are well known and preferably should be maintained substantially within the range of 950°–1150° F. Different adsorbents, e. g., bauxite, may permit somewhat different temperatures. In the carbonizing process, it has been found the carbonization temperature may be varied over a wider range, for instance, within the range of about 900°–1500° F. with equal success. This is of itself an advantage since once such regeneration may be effected with less chance of damaging the clay. The optimum time of heating when carbonizing varies from a few seconds at 1500° F. to several minutes at 1000° F.

The important feature in regenerating by carbonizing is proper control of the atmosphere in the regenerating or activating zone. The essential feature is to sufficiently restrict the amount of air or other carbon oxidizing gas in the zone that complete combustion or oxidation of the petroleum matter will not occur. It has been found that carbonization takes place both in the complete absence of air or other carbon oxidizing gas and also in the presence of limited amounts thereof, provided the quantity is insufficient to entirely oxidize the carbon from the clay. Therefore, in carrying out the carbonization, the heating zone may be completely sealed and no air admitted or a limited amount of air may be admitted, with or without other inert gases. It also has been found that, if desired, steam may be admitted to the carbonizing zone. The presence of steam facilitates the removal of hydrocarbon vapors and reduces the rate of carbon build-up on the clay. For some oils it appears carbonizing in the presence of steam gives slightly better results; however, in general, reactivation is approximately the same for all the above carbonizing methods.

In the carbonizing operation, the adsorbents are passed through the kilns in the same manner as when regenerating by burning, and the same kilns may be used, if adequate provision is made for suitably controlling the atmosphere in the kilns. In practice we prefer to carry out our process in an apparatus of the type disclosed in the co-pending applications, S. N. 270,942, filed April 29, 1939; S. N. 279,008, filed June 14, 1939; and S. N. 328,243, filed April 6, 1940, of John W. Payne. These Payne kilns permit an unusually close control of the atmosphere in the kiln and also of the temperature of the particles. Further, the Payne apparatuses have several construction and operating advantages over the conventional regenerating kilns. Still further, the apparatus disclosed in S. N. 270,942 is well suited for regenerating the finely divided contact clays as well as the granular clays, the clays being carried through the apparatus suspended in a gaseous medium.

In the course of our experiments we tested adsorbents on many petroleum products, including the following oils:

Table I

| Stock | Specific gravity | S. U. viscosity | Crude source | Treatment before filtration |
|---|---|---|---|---|
| A | .885 | 88–90 @ 210° F | Oklahoma City (resid.) | Solvent refined. |
| B | .884 | 98–101 @ 210° F | do | Do. |
| C | .925 | 61–63 @ 210° F | Coastal (distillate) | Sulfuric acid refined. |
| D | .905 | 320–330 @ 100° F | Coastal (distillate) + paraffin (distillate). | Do. |

The following data clearly shows the surprising nature of our improvement:

Table II

| Stock | Clay | Percent percolation efficiency (without naphtha dilution) | |
|---|---|---|---|
| | | Multiple hearth "burned" clay | Our "carbonized" clay |
| A (solvent refined) | Fresh burned | 100 | 100 |
| | No. 10 regenerated | 50 | 250 |
| | Av. No. 1 to No. 10 | 63 | 246 |
| | Burned after 15 carbonizations | | 90 |
| B (solvent refined) | Fresh burned | 100 | 100 |
| | No. 9 regenerated | 52 | 125 |
| | Av. No. 1 to No. 9 | 66 | 131 |
| | Burned after 6 carbonizations | | 110 |
| C (acid refined) | Fresh burned | 100 | 100 |
| | No. 10 regenerated | 50 | 90 |
| | Av. No. 1 to No. 10 | 65 | 96 |
| | Burned after 9 carbonizations | | 97 |
| D (acid refined) | Fresh burned | 100 | 100 |
| | No. 6 regenerated | 58 | 77 |
| | Av. No. 1 to No. 6 | 69 | 80 |
| | Burned after 6 carbonizations | | 116 |

The data in Table II discloses that carbonized adsorbents are generally superior to burned clays, in fact, for solvent refined oils, the carbonized clays are shown to be vastly superior. Then the data shows that after a considerable number of regenerations, at which time the burned clays are of very low efficiency and ready to be discarded, the carbonized clays may be burned to remove substantially all carbon thereby yielding clays which have approximately their original activity as fresh burned clays.

In order to further illustrate the invention the following example is given:

*Example*

A new clay, whose efficiency was considered 100%, was carried through 12 carbonizing regenerations whereby it suffered a progressive decrease in efficiency on acid-refined oil. At the end of these 12 regenerations the clay was given a burning regeneration to remove substantially all carbon. After this burning regeneration the decolorizing efficiency was 106% of the new clay on the same acid-refined oil. Thereafter, this burned clay was carried through 10 additional carbonizing regenerations, and it again suffered a progressive decrease in efficiency. The carbon then was removed by a second burning regeneration, and the decolorizing efficiency of this burned clay on the same acid-refined oil was 105% of the new clay. And, it is to be noted, that this clay which now has an efficiency of 105% of new clay has been through twenty-four (24) regenerations, that is, twenty-two carbonizing regenerations and two burning regenerations.

The physical characteristics and oxidation stability of oils percolated through our carbonized clays are approximately the same as those of oils percolated to the same blend color through conventionally burned clays. And, while the invention has been described with particular reference to clays since they are at present the most important petroleum adsorbents, it is to be understood that the invention is applicable to any other adsorbents that may be used for refining petroleum, as, for example, bauxite, silica gel, etc.

Further, although the process has been described in connection with the refining of petroleum products, the invention may be applied to methods of refining other carbonaceous materials, e. g., sugar liquors, with adsorbents in order to increase the efficiency of the adsorbents and increase the life of the adsorbent by substantially retarding increase in density of the adsorbent from the periodic regenerations.

This application is a continuation-in-part of our copending application S. N. 275,672, filed May 25, 1939.

We claim:

1. The method of increasing the useful life of a solid inorganic adsorbent used in a plurality of contacting operations each involving the deposit of a carbonaceous contaminant thereon by regenerating said adsorbent in repeated cycles each cycle consisting of a plurality of partial removals of a contaminating deposit by burning while leaving a substantial portion of carbonized carbonaceous matter as a carbon deposit on the adsorbent followed by substantially complete removal of a deposit by burning off substantially all carbonaceous substances.

2. The method of increasing the useful life of a solid inorganic adsorbent used in a plurality of contacting operations each involving the deposit of a carbonaceous contaminant thereon which comprises regenerating said adsorbent intermediate each contacting operation, said regenerations occurring in the form of repeated cycles each cycle consisting of a plurality of partial removals of a contaminating deposit by burning while leaving a substantial portion of carbonized carbonaceous matter as a carbon deposit on the adsorbent followed by at least one substantially complete removal of a deposit by burning off substantially all carbonaceous substances.

3. The method of increasing the useful life of petroleum percolation clay and the like used in a plurality of contacting operations each involving the deposit of a carbonaceous contaminant thereon which comprises regenerating said clay intermediate each contacting operation, said regenerations occurring in the form of repeated cycles each consisting of a plurality of partial removals of a contaminating deposit by burning at a temperature maintained between about 900° and 1500° F. to leave a substantial portion of carbonized carbonaceous matter as an active carbon deposit on the clay followed by at least one substantially complete removal of a contaminating deposit by burning off substantially all carbonaceous substances, the temperature of said last-named burning being maintained between about 950° and 1150° F.

THOMAS P. SIMPSON.
JOHN W. PAYNE.
PETER D. VALAS.